Sept. 26, 1961 A. NUUT 3,002,097
DISPERSION SCANNER
Filed Feb. 9, 1953 3 Sheets-Sheet 2

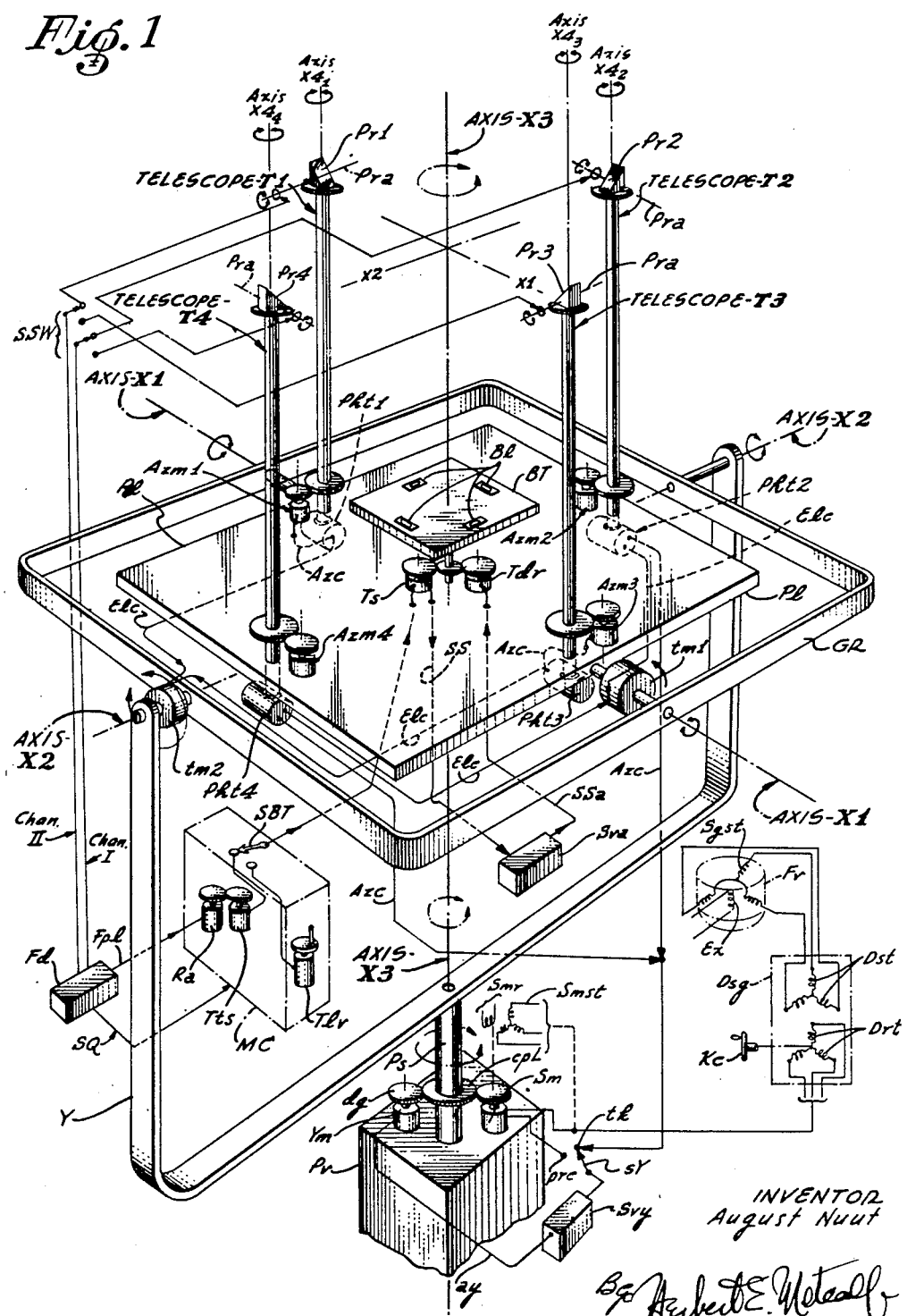

INVENTOR:
August Nuut
By Herbert E. Metcalf
His Patent Attorney

Sept. 26, 1961        A. NUUT        3,002,097
DISPERSION SCANNER
Filed Feb. 9, 1953        3 Sheets-Sheet 3
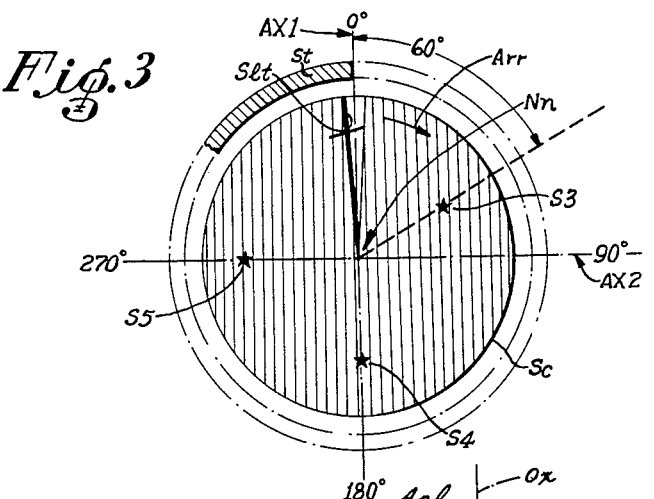
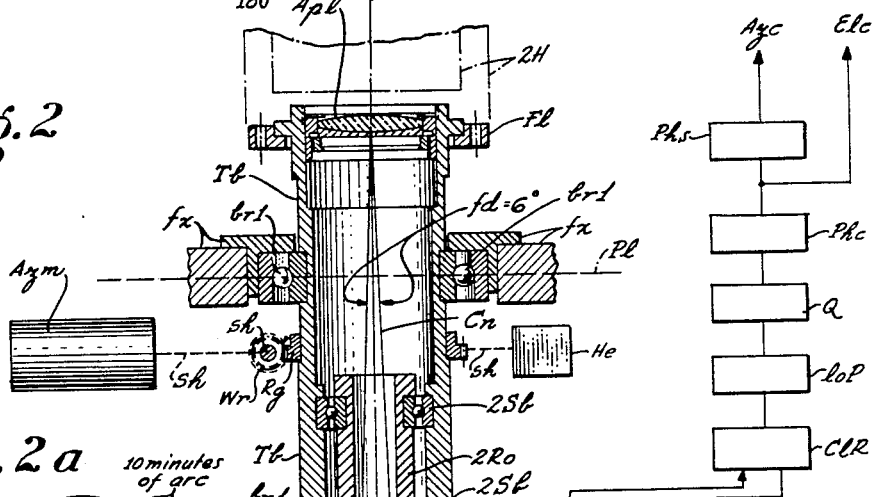
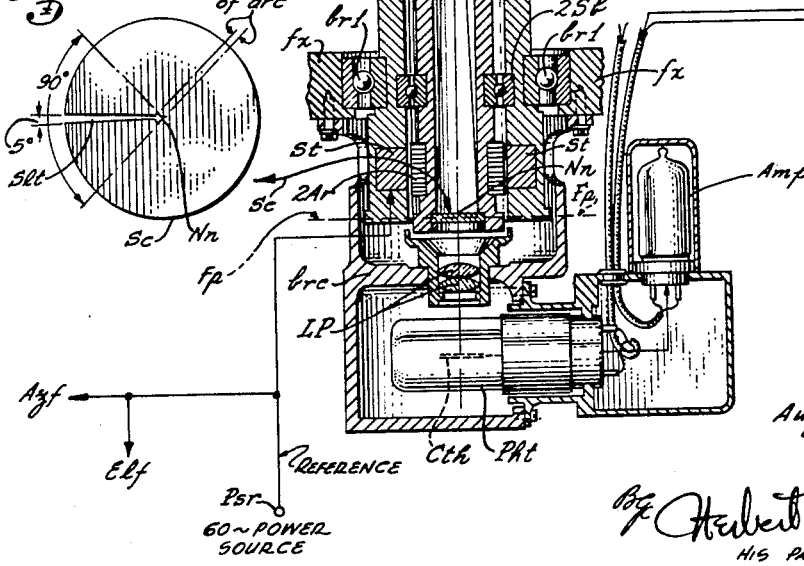
INVENTOR
August Nuut
HIS PATENT ATTORNEY

United States Patent Office 3,002,097
Patented Sept. 26, 1961

3,002,097
DISPERSION SCANNER
August Nuut, Glendale, Calif., assignor to Northrop Corporation, Hawthorne, Calif., a corporation of California
Filed Feb. 9, 1953, Ser. No. 335,647
21 Claims. (Cl. 250—203)

The present invention relates to star tracking systems or the like, and more particularly, to light chopping means adapted to operate in automatic celestial navigation systems.

The success of apparatus for celestial guidance is of course dependent upon accurate star tracking, with particular emphasis upon a means and method of scanning the position of the star image in the tracking telescope so that accurate error signals of useful amplitude will be obtained, particularly at or close to the null position, the latter point being for practical purposes in the optical axis of the tracking telescope.

Accordingly, it is an object of this invention to provide an improved star image follower yielding very accurate tracking error signals for use in automatically establishing continuous celestial fixes aboard a craft to be navigated.

It is still another object of the present invention to provide a means and method of scanning a star image in an automatic celestial navigation system utilizing tracking telescopes, to provide error signals variable in length in accordance with the distance from a null position within a circle having a predetermined relatively short radius therefrom, but uniform in length over longer radii, so that maximum tracking accuracy is obtained close to the null position.

It is another object of the invention to provide, in an automatic celestial navigation system, an image scanning system in a tracking telescope providing different types of error signals according to the image deviation distance from a null position in the telescope.

Briefly, my invention comprises a tracking telescope with a scanning disk at its focal plane, which disk has a relatively narrow radial slot in its outer portion and a relatively wide flared opening in its inner portion, converging to a point at the center. The words "slot" and "opening" include any construction which forms a light signal produced and defined in an analogous manner.

In one form of system in which this invention is employed, the system comprises a freely-gimballed platform upon which are mounted star trackers including star image scanners and angle setting devices. The latter control the angles between the platform and the star trackers according to the computed star altitude schedule, and the normal to the platform under these conditions will be maintained in the direction of the specified dynamic vertical as long as the star trackers are accurately aimed at their corresponding stars, irrespective of the instantaneous position or motion of the craft. Any difference between the direction of this normal to the specified horizontal plane or platform and the apparent vertical, such as it is actually observed aboard the craft at any instant, appears in the form of horizontal acceleration error components in the specified plane of the platform. Acceleration-sensitive devices are supported in a plane parallel to this specified plane in order to be able to detect these horizontal acceleration errors. From the latter, acceleration correction signals are derived which are injected into the craft's control system as equal and opposite accelerations, so as to correct the craft's motion and thereby to reduce the acceleration error signals to zero. This system is fully described and claimed in a copending application of Dixson, Serial No. 314,449, filed October 13, 1952, for a Guidance System, and assigned to the present assignee.

In the accompanying drawings:

FIGURE 1 is a simplified diagram of an automatic sextant, showing the major components thereof, including four telescopes which embody the present invention.

FIGURE 2 is a cross-sectional elevation view of one of the telescope units of FIGURE 1 and block diagram of control units in a signal channel of the star tracking system associated with this telescope, showing also the location of the scanning disk.

FIGURE 2a is an enlarged plan view of the scanner disk, showing the preferred form of slot with flared portion near the disk center.

FIGURE 2b is an enlarged view of the central portion of the scanning disk shown in FIGURE 2a.

FIGURE 3 is a simplified sketch showing general operating principles of the star tracking system.

Figure 2B:
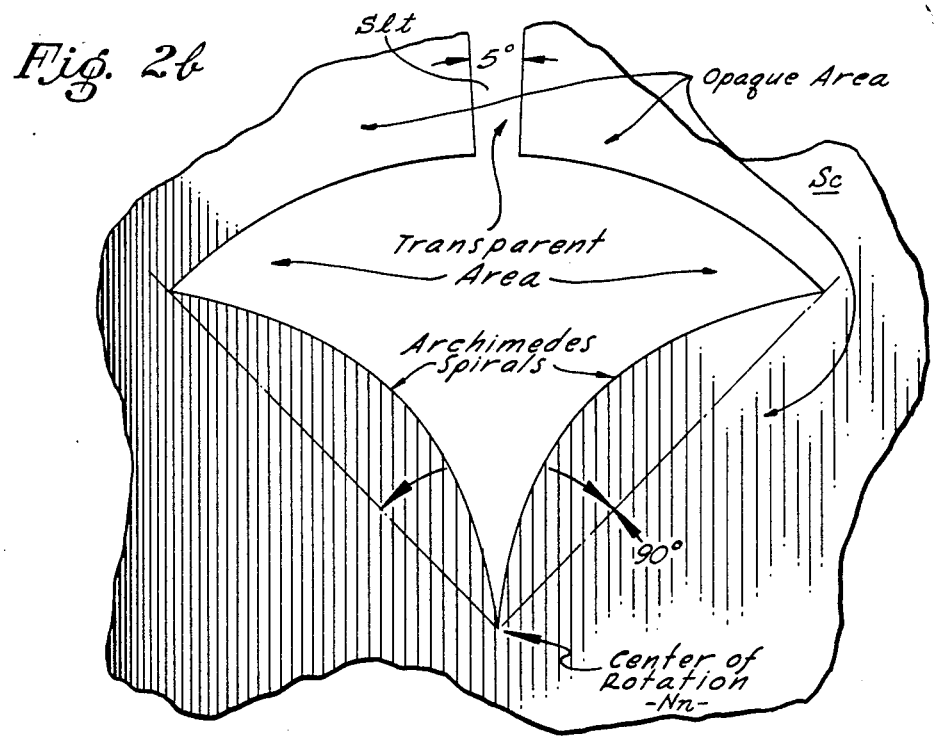

In the ensuing detailed description of the essential component units of the automatic sextant, reference will be made to the composite drawing of FIGURE 1 whenever it is necessary either to determine the general location or function of a component unit or to verify the definition of certain operational axes of the sextant given in connection with these drawings. The various rotational axes of the gimbal system, telescopes etc. shown in FIGURE 1 will here be defined as follows:

Axis X1 is the rotational axis of the platform assembly within gimbal ring GR, also defined as the gimbal axis X1. (In FIGURE 1, platform P$l$ is represented as a square-shaped plate P$l$ carrying bubble turret BT, the latter also represented as a square plate, and telescopes T1, T2, T3 and T4. The optical axes O$x$ of the telescopes are held in a fixed position normal to this platform plane P$l$. Telescopes T1 and T3 are mounted upon this axis X1.

Axis X2 is the rotational axis of gimbal ring GR within yoke Y, also defined as the yoke-axis X2. Telescopes T2 and T4 are mounted upon this axis.

Axis X3 is the rotational axis of yoke Y about its azimuth pivot P$v$ and therefore virtually also the azimuth rotation axis of platform P$l$ relative to the supporting craft and the azimuth rotation axis of bubble turret BT relative to the platform P$l$. (This definition for axis X3 disregards the tilt produced in the platform and bubble turret rotational axes against the yoke-pivotal axis when the platform is rotated about yoke axis X2 or gimbal axis X1 away from its position of equilibrium. These deviation axes will nevertheless be classified as X3 axes.)

Axes X4 (=X4$_1$, X4$_2$, X4$_3$ and X4$_4$) are the azimuth rotation axes of the telescopes relative to platform P$l$ coincident with the optical axes O$x$. Telescopes T2 and T4 have been arbitrarily determined to remain in fixed azimuth relationship to platform P$l$ during star tracking operations, whereas telescopes T1 and T3 are rotated about their azimuth axes X4 relative to the platform during these same tracking operations.

The horizontal axis of rotation P$ra$ of each prism P$r$ is the elevation or altitude axis of the prism. Any prism elevation- or altitude-angle resulting from rotation of the prism about this axis is measured against the plane of platform P$l$. If such a prism elevation angle is to represent a given elevation or altitude angle of a star, the plane or platform P$l$ must coincide with the same spacial plane against which the star altitude angle is measured. The actual prism elevation angle relative to a star (i.e., the spacial elevation angle of the prism's or telescope's "line of sight") therefore depends on both, the position of platform P$l$ relative to space and the elevation angle-setting of prism Pr relative to platform Pl.

Torque motors tm1 between gimbal ring GR and brackets Brt of telescopes T1 and T3 serve to rotate the platform assembly about axis X1. In turn, gimbal ring GR, and with it the platform assembly, are rotated about axis X2 by torque motors tm2.

Pivot: A circular plate cpL whose center portion extends downward into a sleeve sl which surrounds pivotal shaft Ps and carries a slipring assembly (not shown) on its outer surface, is rigidly attached to yoke Y as shown. Ring gear Ri, mounted on the lower rim of circular plate cpL, is engaged by gear dg (actually by a pinion), driven from yoke azimuth drive motor Ym which is supported in the structure of pivotal support Pv which is in turn fixed to the craft. Pivot shaft Ps rotates about this pivotal support Pv. Power transfer to the rotating sliprings is carried out by a set of two very thin strips of flat sheet-stock per slipring. These strips (not shown) are preferably made of beryllium copper, each strip carrying a contact pin of platinum-iridium. The sliprings preferably consist of rhodium-plated brass. The contact strips are mounted on both sides of transfer plates (not shown) which enter into the free space between the slipring mounts and are supported in the pivotal structure Pv.

Wire connections are carried from yoke Y to gimbal ring GR (and vice versa) as well as from gimbal ring GR to the platform assembly (and vice versa) by means of flexible "pigtails." All power supply and signal currents enter or leave the automatic sextant through the bottom of the pivotal support. The entire wiring as well as the temperature control system are omitted from the drawing.

One of the four telescope units summarily designated with numerals T1, T2, T3 and T4 in FIGURE 1 is shown in greater detail in the cross-sectional elevation view of FIGURE 2. An altitude angle generator which forms part of each telescope unit and of the over-all star tracking system associated with each telescope unit, is not shown in this drawing. However, a portion of the supporting bracket 2H of the altitude angle generator which is marked in FIGURE 2 by broken-off dash-dot lines 2H, as well as flange Fl illustrate how the generator is mounted on top of telescope barrel Tb, line Ox indicating the orientation of the optical axis of the telescope. Each of the four telescope units is identical in construction.

In FIGURE 2, cylindrical telescope barrel Tb is shown to be supported on bearing br1 which holds the barrel in such a position that the optical axis Ox of the telescope which coincides with the longitudinal axis of barrel Tb, remains at all times normal to plane Pl, the latter being representative of the plane of platform Pl of FIGURE 1. Fixtures fx contain bearing br1. Aplanatic objective lens Apl receives light from an interesting star and its surrounding field (the reflected starlight passing through the hollow cylinder portion of bracket 2H) and focuses this light on focal plane Fp within the optical field of the telescope.

A scanner motor is mounted inside the lower portion of barrel Tb, the axis of rotation of its armature coinciding with the barrel axis or optical axis Ox. The scanner motor consists of stator St which is fixed to the inner wall of barrel Tb, and a hollow-shaft cylindrical rotor 2Ro with armature 2Ar, the rotor being held in scanner bearings 2Sb in the inside wall of barrel Tb. The hollow shaft of rotor 2Ro permits passage of light from the stars and at the same time helps shield the focal plane from random light, acting as an effective baffle. The diameter of the hollow portion of rotor 2Ro determines the diameter of the circular optical field in focal plane Fp which, in turn, determines also the extent of the telescope's field of view in the sky. (The "field angle" of the telescope equals 6 degrees and can be expressed as the angle fd subtended at the center of lens Apl by the surface of cone Cn whose base constitutes the circle of intersection of the interior surface of hollow rotor 2Ro with focal plane Fp.) Attached to the lower end of rotor 2Ro and rotating therewith in the focal plane Fp is a scanner disk Sc whose surface is opaque except for a slot Slt (see separate sketch of disk Sc in FIGURE 2a and text below), the apex of the slot being located at the center of rotation of the disk which in turn coincides with the null position Nn in the optical field. Rigidly secured to the supporting fixture fx is a cylindrical bracket brc which holds a set of achromatic collimating (paralleling) lenses LP below and concentric with barrel Tb. The light falling upon the optical field in focal plane Fp passes through lenses LP as a modulated light source whose frequency of modulation equals the rotational speed of the scanner motor, stator St being preferably supplied from a 60 cycle power source Psr. The phase of this 60 cycle power source serves as a reference phase for the null seeking star tracker servo system. The modulated light from lenses LP is directed onto cathode Cth of photocell Pht (mounted on bracket brc below lenses LP) which converts the incident light into essentially square-pulsed electrical energy, to be preamplified in amplifier Amp.

This modulation system employing a rotating slotted shutter between focal plane Fp and photocell Pht permits the scanning of adjacent finite sections of a given field of view. In accordance with the techniques expounded in this specification for pointing the telescope at precomputed star elevation and azimuth angles, this field of view, at the onset of a given pre-calculated tracking period and under the required conditions of flight, is expected to contain a distinguishable star whose light predominates over that from undesirable sources, such as non-interesting stars, uniform or non-uniform background-light etc. Each finite section of the field of view generates a photocell signal output characteristic of the light content in that section. A complete scanning sequence from a known starting position of disk Sc through succeeding adjacent sections around the field back to the starting position causes one cycle of signal output of the photocell which is qualitatively characteristic of the particular field scanned. This cyclic photocell-signal thus becomes a function of disk or shutter position. By identifying the disk position with a synchronous reference potential of a frequency equal to the rate of disk rotation and by utilizing means for comparing the phase of this reference voltage with the phase of a filtered photocell signal component of the same frequency (see below) which is representative of the position of the interesting star image within the scanned optical field, any azimuth and elevation deviations of the star image from the null-position of the field can be automatically derived as error signals and corrected by means of the star tracking servo system to be described more fully in connection with FIGURE 3.

In order to secure useful error-correcting signals from the photocell currents, the output from pre-amplifier Amp (cathode follower) in FIGURE 2 is first passed through a clipper and low pass filter, represented by boxes ClR and loP, respectively, which eliminate all spurious background signals including the lower magnitude signals of non-interesting stars. In all cases in which the interesting star image is not located at the center of the optical field, this star image generates a pulse which may be considered a complex wave of a series of higher frequency harmonics occurring with a repetition rate of 60 cycles per second. The width of the essentially square shaped 60 cycle signal pulse from low pass filter loP is determined by the shape of slot Slt, by the rotational speed of disk Sc and by the degree of proximity of the interesting star image to the null-point Nn. Figure 2a shows a plan view of disk Sc, illustrating a preferred type of scanning slot Slt which is slightly wedge-shaped and approximately 5 degrees wide near the periphery of the disk. This slot opens into a flared area near its apex, the flared area covering 10 minutes of the six-degree angle $fd$ illustrated in FIGURE 2 and 90 degrees in width at its open end, diminishing in width towards center $Nn$ at the rate of 9 degrees per minute of arc of angle $fd$. FIGURE 2b shows the flared area in greater detail.

It is highly important for the overall accuracy of the ACN system that the slot itself be as accurate as possible. Extreme accuracy is obtained as follows:

The slot sector outline is first carefully drawn as a five-foot figure. This figure is then photographed and reduced in size to a one-foot reproduction. Next, this latter figure is focused on a sensitized film on the one-inch glass scanning disk $Sc$, which film is developed to produce the desired ½ inch slit reproduction on the disk. Thus, the scanner disk $Sc$ has an accurate photographic image formed directly on its surface. Control of locating the one-foot image (reduced to ½ inch) on the scanner disk is governed by use of a microscope for observation of the image. In order to facilitate this location, the slit image on the sensitized scanning disk film is projected thereon by light, either greatly reduced in intensity, or of red color for example, so that the center point of the slit image can be accurately located with respect to the scanner center under the microscope without appreciably exposing the film. After centering is effected, full light exposure and development is made to create the desired scanner configuration, with the slit sector clear, the remainder of the disk being developed to a solid opaque black.

Figure 2C:
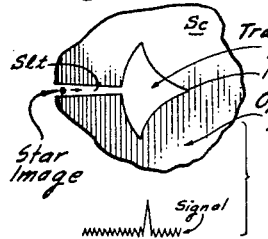
FIGURES 2c through 2h are diagrams showing the signals resulting from scanning a star image by the present invention.
Figure 2D:
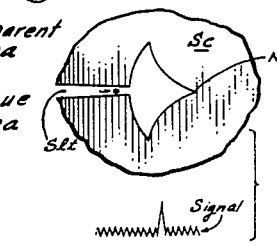

When the telescope is not focused on a star, for all instantaneous positions of the scanner disk $Sc$, a constant amount of light is admitted through the disk and the collecting lenses to the phototube mounted below the telescope. This background light accounts for the large portion of the output circuit noise level. With the acquisition of a star at the outer edge of the scanner disk, however, the scanner disk, at an instantaneous angular position corresponding to the focal point of the light from the star, admits star light to the phototube. When the slot angle at which the star image is admitted is compared with the phase angle of the synchronous motor voltage revolving it, the angular direction of the light from the disk center is derived. As the slot at this radius of the disk is a constant angular width (5°), the time during which the star light is admitted is constant. The pulse angle then gives only the angular direction of the tracking error. In FIGURE 2c the signal created by the star image is of short duration as determined by the constant angular width of the slot. The duration of the signal is the same, as the star image moves toward the center of the disk as seen in FIGURE 2d.

Figure 2E:
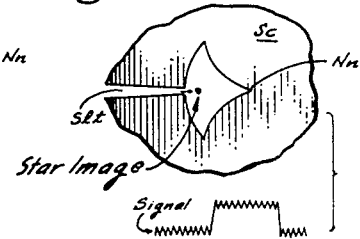
Figure 2F:
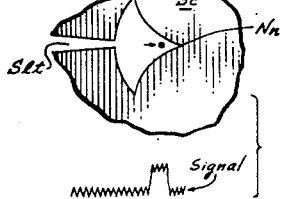

As the star image moves in toward the disk's center, it reaches the portion of the slot area where the slot angle is proportional to the distance from the center (FIGURES 2e and 2f). That is, $$P = K\phi$$

where:

$P$ = distance from center and
$\phi$ = angular width of transparent slot.

When the star image first enters this proportional area, the star signal pulse broadens to 90°. As the star image moves nearer to the center of the scanner disk, the slot width and pulse width decrease correspondingly. Thus, where the constant angle portion of the slot supplied information as to direction of error only, the star image in the proportional area supplies, by variations in signal width, information as to the distance of the error as well.

Figure 2G:
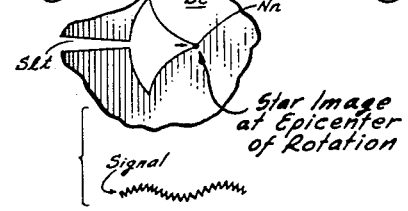
Figure 2H:
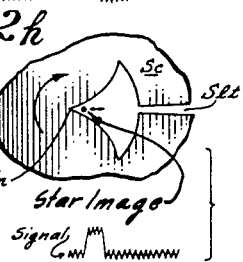

As the star image approaches the center of the disk it reaches a point where, due to its size, the star image becomes tangent to the two sides of the slot. From this point to the disk's center, the phototube's output is a sine wave, as shown in FIGURE 2g. In this area—equivalent in the system described herein to approximately ±40 seconds of platform alignment error—the platform deviations are constantly being adjusted in a random manner. As the star image passes through the epicenter, the signal is reversed with relation to the reference frequency, as indicated in FIGURE 2h.

In the band pass and 60 cycle low "Q" resonant filter following the low pass filter $1oP$ (designated by box Q), the isolated star pulse of 60 cycle repetition rate is converted into a 60 cycle sinusoidal signal whose amplitude is proportional to the width of the signal pulse, a wider pulse being equivalent to a stronger pulse, capable of ringing a "louder" resonance. The phase of this 60 cycle resonant frequency is in step with the signal pulse which "rings" the resonator Q. The amount of electrical degrees by which the signal pulse, and with it the 60 cycle resonant frequency, is phase-displaced from the reference frequency of the scanner (discounting additional phase shifts introduced in the signal channel) is determined by the position of the desired star image in the optical field of the scanner relative to a reference axis in this field. This can be clearly seen in the simplified sketch of FIGURE 3 which serves to illustrate the general operating principles of the basic star-tracking system under observation. In this diagram, two mutually perpendicular axes $Ax1$ and $Ax2$ are laid out in the plane of scanner disk $Sc$ of FIGURE 2, their point of intersection $Nn$ coinciding with the center of rotation of disk $Sc$. These axes must be visualized as remaining in a fixed position relative to stator $St$ in the telescope barrel $Tb$ of FIGURE 2 while disk $Sc$ is rotating. Such a condition is suggested in FIGURE 3 by showing a broken away portion of the stator "lined up" tangent to axis $Ax1$. Let the one arm of axis $Ax1$ which is marked "0 degrees" and which cuts through stator $St$ at a predetermined location, be selected to represent the zero reference axis in the optical field. A simple, wedge-shaped slot $Slt$ in disk $Sc$ is shown in alignment with this reference axis. This is the zero position of the slot (or disk) through which the latter rotates each time the reference field voltage of the scanner drive motor (from source $Psr$ in FIGURE 2) goes through its zero phase. Three interesting star images S3, S4, and S5 have been inserted in the optical field at different locations away from null point $Nn$, thus representing a variety of tracking errors of the telescope. If the disk rotates in the direction of arrow $Arr$, the reference phase will have progressed 60 electrical degrees from zero when the star image S3 appears through the rotating slot $Slt$. The 60 cycle voltage, generated in the resonant filter "Q" of FIGURE 2 by the isolated star signal pulse from photocell $Pht$, under these conditions (and disregarding other factors), will therefore lag 60 degrees behind the reference voltage. If this 60 cycle signal from the resonant filter Q is used in a servo system so as to rotate stator $St$, and with it the reference axis "0° $Ax1$" and the associated prism, clockwise through 60 degrees in azimuth, the 60 degree phase lag of star image S3 will be reduced to zero. Obviously, this signal acts to correct an azimuth error only. However, if a second correction signal is derived from this azimuth error signal by, say, a 90 degree phase advance of the latter, this second signal voltage first shows a 30 degree phase advance over the reference voltage and can be used in a servo system which acts to tilt disk $Sc$ about axis $Ax2$ in a sense so as to move image S1 towards that axis. This latter correction signal would thus act as an elevation or altitude control voltage. Since both control voltages act simultaneously, the phase of the altitude error voltage will be affected by the action of the azimuth servo system as long as the azimuth error is not reduced to zero. If in the present example the 60 degrees phase lag of the azimuth error signal is reduced to zero and an altitude error still exists, this altitude error signal will lead the reference voltage by 90 degrees. Axis Ax2 about which the elevation correction torque is being applied, has rotated clockwise through 60 degrees, along with reference axis Ax1, so that the prevailing elevation torque moves the star image straight towards Nn.

Returning to FIGURE 2, it is seen that the identical 60 cycle power source Psr which drives the scanner motor, is also used to feed the reference (or fixed) field coils of the azimuth and elevation servo motors (as indicated by the feed lines Azf and Elf, respectively) which act in conjunction with the amplified correction voltages from the photocell output (to be further discussed below, these voltages being fed to the respective control field coils of these servomotors) to reduce the tracking error of the telescope to zero. For these servo motors, the general principle applies that if the control field and the reference field in any one motor are in phase or 180° out of phase, zero torque is produced in that motor; if control and reference fields are 90° or 270° out of phase, maximum torque is generated. For all intermediate phase differences, the torque assumes a proportionate intermediate value, the sense of torque depending on whether the phase of the control field leads or lags that of the reference field. In addition to this, the effective torque depends also on the amplitude of the torque signals in the control field. Thus, in the example of star-image S3 of FIGURE 3, the initial 60 degree phase delay in the azimuth error control signal which feeds into the control field coils of the azimuth servo motor, as well as the initial 30 degree phase advance of the elevation error control signal in the control field coils of the elevation servo motor, will both cause torque in the respective servo motors. In the case of star image S4 of FIGURE 3, the initial 180° phase difference between the azimuth servo-reference field and azimuth servo-control field will produce zero torque in the azimuth servo motor. If star image S4, besides being located on the 180 degree arm of axis Ax1, were also located upon axis Ax2, vis. at the center Nn of the optical field, portions of the interesting star image would constantly sensitize the photocell-cathode during the entire 360 degrees of each disk rotation. This would practically eliminate the 60 cycle pulse from the input to resonant filter Q of FIGURE 2, reducing the servo correction voltages to zero in both, the azimuth and elevation servo motors. Since the star image S4 is displaced from the tilt axis Ax2 and necessarily also from null point Nn, the 60 cycle output from resonant filter Q will persist, but due to its 180 degree phase displacement from the reference field, it will not cause any servo-action in the azimuth motor. The elevation error control signal, in this case, will produce maximum torque in the elevation servo motor due to its 180+90=270 degree phase difference from the reference field. Both, the azimuth and elevation control signals, will disappear when the servo mechanism has caused the star image S4 to shift onto null point Nn.

The advantage of using the flared slot of FIGURE 2a instead of the straight slot depicted in FIGURE 3 lies in the fact that an increased impetus is given to the servo system to drive the star image to the null point when the tracking error is slight (image entering the 10-minutes-of-arc area) and that this impetus is damped as the null point is approached.

In the example of star image S5 of FIGURE 3, it is seen that the azimuth error signal lags the reference by 270° (or leads it by 90°), causing maximum azimuth torque. The elevation signal initially lags (or leads) the reference by 180°, resulting in zero elevation torque. However, as the azimuth servo system acts to reduce the azimuth error to zero, it also acts to build up an elevation correction torque which will be maximum, if an elevation error persists after the azimuth error is reduced to zero.

In a preferred execution of circuit design for the signal channel from photocell Pht in FIGURE 2, resonator Q is followed by a phase corrector Phc which is so adjusted that its output voltage remains in phase quadrature with the reference phase when its input voltage from resonator Q originates from a star image which appears superimposed on the reference axis "0° Ax1." The output voltage from phase corrector Phc goes to the control fields of the elevation torquers via line Elc (and via a torque amplifier not shown in the drawing) and thus serves as the altitude or elevation error correction voltage of the servo system. The same signal from Phc, in a second channel, is further subjected to a 90 degree phase shift (see box Phs; phase shift assumed to be a 90 degree phase advance in the ensuing discussions) and thence fed to the control fields of the azimuth torquers via line Azc (and via a torque amplifier not shown in the present drawing; see unit Svy in FIGURE 1), thus serving as the azimuth correction voltage of the servo system. In practice, the tracking system of each telescope is phase-adjusted by first aiming each pair of telescopes of the same platform axis, such as T1 and T3 or T2 and T4, at a starlight source (which may be artificial) so that the star image appears at the respective null points Nn of the optical fields. For this type of adjustment, the telescopes must be set to their zero-azimuth positions relative to the platform. The platform is then tilted about the corresponding elevation correction axis (i.e., about axis X2 in case of T1 and T3, and about axis X1 in case of T2 and T4, as explained further below) in a direction which causes the star images to be displaced along the respective reference axes "0° Ax1," which is to the right in the drawing for T2 and T4, and downward for T1 and T3, these reference axes pointing "outboard" for T2 and T3 as shown in the drawing. In each case, the output voltage from phase corrector Phc is thereupon adjusted to lead (or lag) the reference voltage by 90 degrees. This automatically eliminates the effects of unwanted phase shifts, the latter being permanently and unavoidably present in the individual photocell output channels.

Proceeding now to the torquers proper, it has been previously stated that telescopes T2 and T4, during tracking operations, remain fixed in azimuth relative to axis X2 of platform Pl, and any azimuth error signals issuing from the tracking channels of these two telescopes are corrected by applying a corresponding torque about axis X3 onto pivotal shaft Ps. (See lines Azc in FIGURE 1 from photocells Pht of telescopes T2 and T4 to servo amplifier Svy, and line ay from Svy to yoke azimuth drive motor Ym, this latter line carrying the amplified azimuth tracking error control signals when switch sY is in tracking position tk. Parts ClR, loP, Q, Phc and Phs of FIGURE 2 are omitted in FIGURE 1.) Azimuth error-signals from the tracking channels of telescopes T1 and T3, however, act to rotate these latter telescopes about their own axes X4$_1$ and X4$_3$, respectively. (See lines Azc in FIGURE 1 from photocells Pht of telescopes T1 and T3 to azimuth drive motors Azm of these telescopes.) Parts listed above which are shown in FIGURE 2 are also omitted in FIGURE 1. The azimuth drive motor Azm which performs these functions and which is actually provided on all four telescopes (see FIGURE 1), is shown schematically in FIGURE 2 where box Azm represents the azimuth motor and dashed line Sh the extension of the motor shaft, illustrating one preferred form of execution. Shaft Sh carries an anti-backlash split worm drive, shown at Wr in cross-section in order to illustrate the manner in which this worm gear drives ring gear Rg and thereby rotates barrel Tb, ring gear Rg being rigidly mounted on the outer surface of barrel Tb.

Tracking error signals in elevation from telescopes T2 and T4 are applied as corrective torque voltages onto gimbal axis X1. (See lines Elc from photocells Pht of telescopes T2 and T4 in FIGURE 1, connected to torquer tm1; only one torque motor shown, a second identical torque motor being provided at the opposite end of the gimbal axis.) Elevation error signals from telescopes T1 and T3 are corrected by torquing the yoke axis X2.

(See lines E*lc* from photocells P*ht* of telescopes T1 and T3 in FIGURE 1, connected to torquer *tm*2; only one torque motor shown.) Reasons for this particular distribution of tracking control functions are, in part, arbitrary. The system here submitted constitutes one preferred form of execution which has been found convenient in practice. It can be recognized, for instance, that by fixing one pair of telescopes (of the same platform axis) to the platform, i.e., by leaving the azimuth torque motors of these two telescopes inoperative during tracking, and by rotating the platform in response to azimuth tracking error signals from these telescopes, azimuth index lines can be provided for both pairs of telescopes and also for the bubble turret. Regarding the tracking control in elevation, the prism elevation angles relative to the platform in one embodiment of navigation system are under control of function pulses from a playback unit (not shown) which drives prisms P*r* about their respective elevation axes P*ra* in FIGURE 1. The tracking control in elevation does not affect the prism-elevation angles relative to the platform. However, by tilting the entire telescope, i.e., the entire platform, at right angles to the platform axis upon which the tracking telescope is located, the elevation angle of the prism relative to space, viz. relative to the interesting star, can be altered independently from the prism setting control. Also, the true purpose of correcting tracking errors in elevation on two telescopes (places at an optimum angle of 90 degrees against each other) by applying corrective tilts onto the platform, is to maintain the platform in a plane normal to a specified dynamic vertical position.

What is claimed is:

1. A light chopper comprising a scanner, means for focusing an image of a point source of radiant energy on said scanner, means for rotating said scanner around a control point, said scanner being divided into two portions having completely different radiant energy propagating characteristics, the dividing lines between said portions intersecting said control point and bounding a light-active flared scanning area having zero width at said control point and having an increasing angular arc width at increasing distances from said control point to a certain distance, and the dividing lines outwardly from said certain distance being on scanner radii positioned centrally of said flared area and being a relatively thin extension thereof.

2. A light chopper comprising a scanner, means for focusing an image of a point source of radiant energy on said scanner, means for rotating said scanner around a control point, said scanner being divided into two portions having completely different radiant energy propagating characteristics, the dividing lines between said portions intersecting said control point and bounding a light-active flared scanning area having zero width at said control point and having an increasing angular arc width at increasing distances from said control point to a certain distance, and the dividing lines outwardly from said certain distance being on scanner radii positioned centrally of said flared area and being a relatively thin extension thereof, and means for creating electrical signals from radiant energy modulated by scanner rotation.

3. Apparatus in accordance with claim 2 wherein means are provided to rotate said scanner in synchronism with and in a given phase relation to a given reference frequency.

4. A light chopper comprising a scanner, means for focusing an image of a point source of radiant energy on said scanner, means for rotating said scanner around a control point, said scanner being divided radially into two portions including a light-passing portion and an opaque portion, the dividing lines between said portions intersecting said control point, at least one of the dividing lines adjacent said control point being curved in the direction to bound one side of a relatively wide scanning area having an increasing angular arc width at increasing distances from said control point to a certain distance, and the dividing lines outwardly from said certain distance being on scanner radii and bounding a substantially thinner scanning area extended from said relatively wide area, a reference frequency supply, a synchronous motor for rotating said scanner around said control point at said reference frequency whereby any deviation of said image from said control point is changed into periodic light signals at said reference frequency, and means for translating said periodic light signals into electrical signals.

5. Apparatus in accordance with claim 4 wherein means are provided to compare the phase of said periodic electrical signals with the phase of said reference frequency as a function of the direction of deviation of said image from said control point.

6. Apparatus in accordance with claim 4 wherein both of said lines adjacent said control point are curved, the rate of curvature of said lines being such that the duration of said periodic light signals is directly proportioned to the distance of said image from said control point, up to said certain distance.

7. A light chopper comprising a scanner, means for focusing an image of a point source of radiant energy on said scanner, means for rotating said scanner around a control point, said scanner having a major and a minor portion having completely different radiant energy translating characteristics, said minor portion being the active scanning area by which desired light information is to be obtained and used, said minor portion being in the shape of a relatively thin slot in an outer division of said scanner, said slot entering a wider flared area in an inner division of said scanner, said flared area having inwardly curved sides meeting at said control point.

8. Apparatus in accordance with claim 7 wherein the radial extent of said inner division is small as compared to the radius of said scanner.

9. Apparatus in accordance with claim 7 wherein the angle between the dividing lines between said portions in said outer division is about 5° and the angle between said dividing lines at the outer extent of said flared area is about 90°.

10. Apparatus in accordance with claim 7 wherein the curvature of at least one of the dividing lines between said portions in said inner division is that of an Archimedes spiral.

11. Apparatus in accordance with claim 7 wherein the curvature of both of the dividing lines between said portions in said inner division is that of an Archimedes spiral.

12. Apparatus in accordance with claim 11 wherein the dividing lines in said outer division are straight and radial, and wherein said minor portion is symmetrical about a radius of said scanner.

13. In an automatic celestial navigation system, a light chopper comprising a scanner, means for focusing an image of a point source of radiant energy on said scanner, means for rotating said scanner around a control point, said scanner being divided into two portions having opposite radiant energy propagating characteristics, the dividing lines between said portions intersecting said control point and bounding a flared area having zero width at said control point and having an angular arc width increasing linearly with the distance from said control point to a certain distance, the dividing lines outwardly from said certain distance being on scanner radii positioned centrally of said flared area and forming a relatively thin extension thereof, and means for creating electrical signals from radiant energy modulated by scanner rotation.

14. A star tracker comprising a platform mounted on gimbals, an optical means for focusing the image of an interesting star mounted on said platform, a scanner disk positioned adjacent the focal plane of said optical means with the disk center intersected by the optical axis thereof, said scanner disk having two portions having opposite radiant energy translating characteristics, the sides of said portions intersecting said center and bounding a light-active flared area having an increasing angular arc width at increasing distances from said center to a predetermined distance, the sides of said portions outwardly from said predetermined distance being on scanner, a reference frequency supply, a synchronous motor for rotating said scanner disk about its center at said reference frequency, said scanner disk chopping light caused by deviation of said image from the center thereof into periodic light signals at said reference frequency, means for converting said light signals into periodic electrical signals, and means for driving said platform to maintain said star image on said disk center in accordance with said periodic electrical signals.

15. A star tracker comprising a platform mounted in gimbals, an optical means for focusing the image of an interesting star mounted on said platform, a scanner disk positioned adjacent the focal plane of said optical means with the disk center as a control point intersected by the optical axis thereof, said scanner disk having two portions having opposite radiant energy translating characteristics, the sides of said portions intersecting said center and bounding a light-active flared area having an increasing angular arc width at increasing distances from said center to a predetermined distance, the sides of said portions outwardly from said predetermined distance being the dividing lines outwardly from said predetermined distance being on scanner disk radii and forming a thin slot with relation to the width of said flared area at said predetermined distance, a reference frequency supply, a synchronous motor for rotating said scanner disk about its center at said reference frequency, said scanner disk chopping light caused by deviation of said image from the center thereof into periodic light signals at said reference frequency, means for converting said light signals into periodic electrical signals, means for comparing the phase of said periodic electrical signals with the phase of said reference frequency to provide control signals representing direction and extent of deviation of said image from said control point when said image is within the range of said flared area and representing direction of deviation only when said image is within the range of said slot, means for tilting said platform in azimuth and elevation, and means applying said control signals to said platform tilting means to cause said star image to return to said control point when deviations occur.

16. A light chopper comprising a scanner, means for forming an image of a point source of radiant energy on said scanner, means for rotating said scanner, said scanner having a light-passing portion and an opaque portion meeting at the center of rotation of said scanner, the sides of said light-passing portion being curved in an inner division of said scanner to provide a flared area widening in arc angle about said center as the distance from said center is increased to a predetermined distance, and the sides of said light-passing portion outwardly from said predetermined distance being radial to provide a constant angle slot of considerably less width than the width of said inner flared area at said predetermined distance, and means for creating electrical signals from radiant energy modulated by scanner rotation.

17. Apparatus in accordance with claim 16 wherein said predetermined distance is less than one-tenth the radial extent of said scanner and wherein the angular width of said flared area at said predetermined distance is about 90°.

18. A light chopper comprising a scanner, means for focusing an image of a point source of radiant energy on said scanner, means for rotating said scanner around a control point, said scanner having a light-active scanning portion and a light-inactive portion having opposite radiant energy reactive characteristics, said scanning portion being a relatively thin substantially sector-shaped slot at its outer end and a relatively wide flared shape at its inner end, said flared shape decreasing in angular arc dimension to zero at said control point.

19. A light chopper comprising a scanner, means for focusing an image of a point source of radiant energy on said scanner, means for rotating said scanner around a control point, said scanner having a light-active scanning portion and a light-inactive portion having opposite radiant energy reactive characteristics, the sides of said scanning portion proceeding radially inwardly from the periphery of said scanner to points equidistant from said control point, said sides then turning in opposite respective directions along arcuate paths around said control point for a predetermined distance, said sides then directed respectively inwardly at an acute angle with said arcuate paths and curving to meet said control point, to form a scanning area having different included arc angles which increase in accordance with the radial distance outwardly from said control point to a maximum at said arcuate paths of said sides, then having a constant included arc angle substantially less than said maximum from said arcuate paths to said scanner periphery.

20. A light chopper comprising a scanner, means for focusing an image of a point source of light on said scanner, means for rotating said scanner around a central control point thereon, said scanner having a transparent portion and an opaque portion meeting at said control point, said transparent portion extending between said control point and the periphery of said scanner on only one side thereof, the arcuate width of said transparent portion increasing from substantially 0° at said control point to about 90° at a radial distance from said control point less than about one-tenth the radial extent of said scanner, and said arcuate width then reducing to and remaining substantially constant at about 5° from the 90° distance out to the periphery, said transparent portion being symmetrical about a radial line of said scanner.

21. Apparatus in accordance with claim 20 wherein said transparent portion changes from said 90° width to said 5° width along an arc of a circle centered at said control point.

References Cited in the file of this patent

UNITED STATES PATENTS

| | | |
|---|---|---|
| 2,102,145 | Fallou | Dec. 14, 1937 |
| 2,369,622 | Toulon | Feb. 13, 1945 |
| 2,425,541 | Konet | Aug. 12, 1947 |
| 2,428,990 | Rajchman | Oct. 14, 1947 |
| 2,468,042 | Cranberg | Apr. 26, 1949 |
| 2,513,367 | Scott | July 4, 1950 |
| 2,713,134 | Eckweiler | July 12, 1955 |

FOREIGN PATENTS

| | | |
|---|---|---|
| 33,746 | Netherlands | Oct. 15, 1934 |